United States Patent [19]

Schine

[11] Patent Number: 4,639,766
[45] Date of Patent: Jan. 27, 1987

[54] PHASE AND AMPLITUDE CONTROL OF VERTICAL MODULATION IN HORIZONTAL SCAN OF CRT HIGH RESOLUTION TELEVISION

[75] Inventor: Jonathan M. Schine, Los Angeles, Calif.

[73] Assignee: High Resolution Television, Inc., Los Angeles, Calif.

[21] Appl. No.: 656,864

[22] Filed: Oct. 2, 1984

[51] Int. Cl.⁴ .............................................. H04N 9/00
[52] U.S. Cl. ............................. 358/21 R; 307/219.1; 328/20
[58] Field of Search ...................... 307/219.1; 328/20; 358/12, 21 R, 68

[56] References Cited

U.S. PATENT DOCUMENTS

| | | | |
|---|---|---|---|
| 2,831,108 | 4/1958 | Barditch | 328/20 |
| 3,335,290 | 8/1967 | Fischman et al. | 328/20 |
| 3,601,705 | 8/1971 | Germann | 328/20 |
| 4,101,789 | 7/1978 | Ruhnan | 328/20 |
| 4,472,881 | 9/1984 | Houck | 328/20 |

Primary Examiner—John W. Shepperd
Attorney, Agent, or Firm—Freilich, Hornbaker, Rosen & Fernandez

[57] ABSTRACT

In a system for high resolution television achieved by vertical modulation of the horizontal scan at a frequency twice the color subcarrier, the modulation signal is derived from the color subcarrier at both the camera and receiver by squaring the color subcarrier sinusoidal signal, inverting the squared waveform, differentiating the inverted and uninverted square waveforms and from the combined differentiated pulses producing a train of pulses at a frequency twice the color subcarrier. This train is then applied to a transistor connected as a class B amplifier with the vertical deflection coil and a parallel capacitor as an LC resonant load. The current to the coil is provided by a regulated power supply that is adjustable to adjust the amplitude of the vertical deflection of the horizontal scan.

6 Claims, 8 Drawing Figures

PHASE AND AMPLITUDE CONTROL OF VERTICAL MODULATION IN HORIZONTAL SCAN OF CRT HIGH RESOLUTION TELEVISION

BACKGROUND OF THE INVENTION

This invention relates to high resolution television or other information display wherein the horizontal scan lines of the camera (or equivalent signal source) are vertically deflected to increase the video information transmitted and the horizontal scan lines of the television receiver or monitor are vertically deflected in synchronism with the source, and more particularly to apparatus for controlling the phase and amplitude of the vertical deflection of the horizontal scan at the CRT of a television receiver or monitor.

In a television picture, there are two independent resolution factors, namely horizontal resolution, which depends largely upon system bandwidth, and vertical resolution, which depends largely upon the number of active scanning lines in a frame. Various techniques have been employed to increase horizontal resolution. For example, although the video bandwidth is limited to about 4 MHz, the video signal may be processed by a studio with twice the bandwidth of the transmitter on the theory that the better the picture into the transmitter, the better the picture at the receiver. But vertical resolution has, in the past, remained limited by the number of active scanning lines.

In the United States, the National Television Systems Committee (NTSC) has prescribed as a standard the total number of scanning lines of 525 divided into two interlaced fields. This number is significantly reduced to about 485 active scanning lines by the necessary vertical blanking time (approximately 7.5 percent of the total time for scanning 525 lines). Other factors may further degrade horizontal resolution, such as scanning spot size. It would be possible to increase vertical resolution by doubling the number of active scanning lines and decreasing the spot size, but that would reduce the horizontal resolution for a given bandwidth and frame rate. The problem is to increase vertical resolution without deviating from the NTSC standard of 525 lines. The problem exists as to other standards adopted in other parts of the world, such as PAL and SECAM, since any finite number of prescribed lines less than 1000 may significantly limit the vertical resolution to substantially less than the horizontal resolution.

In a patent application Ser. No. 515,220 now U.S. Pat. No. 4,589,012 filed by Jimmie D. Songer, and assigned to the assignee of this application, vertical resolution is increased for standard television by modulating the vertical scan axis (deflection) of a television camera at a multiple of the color carrier, for example, twice the color carrier frequency of 3.579545 MHz, such that each active scanning line traverses an undulatory path rather than a straight line, i.e., oscillates about the normal scan line. The amplitude of the modulation is preferably sufficient for interlaced lines of a frame to intrude the area of adjacent lines of interlaced fields, which is modulation with an amplitude equal to at least plus and minus one half line spacing of each field above and below the center of the spot on the normal scan line. The video signal thus produced by actually scanning areas above and below the normal scan lines is then transmitted just as for the normal scanning lines, which can be within the vestigial bandwidth limit of about 4.2 MHz for NTSC broadcast transmission, without loss of the high resolution information in the signal transmitted, using a system disclosed in a copending application Ser. No. 654,381 by Arthur C. Phelps filed Sept. 25, 1984, and assigned to the assignee of this application.

In accordance with the system of the Phelps copending application, virtually all of the potential increase in vertical resolution of the aforesaid high resolution television system is preserved in the composite video (Y, I, Q) transmitted within the narrow color subcarrier sidebands of about 3.6 MHz by synchronously detecting high resolution television (HRT) information in the luminance (Y) signal at the vertical scan modulation frequency, and modulating the HRT information with a signal at some predetermined fraction of the vertical scan modulation frequency that is well within the narrow vestigial bandwidth, of the broadcast signal such as one sixth (1.1931816 MHz) the modulation frequency of twice the color carrier frequency of 3.57945 MHz. The high resolution information on the Y signal is thus synchronously detected and then modulated at a lower frequency ($\simeq$1.2 MHz) that is above the color carrier frequency band of the Q signal which is 0.5 MHz and in phase with the Q signal so as to be distinct from the I signal in phase and distinct from the Q signal in frequency. The Y signal modulated with the HRT information (the vertically modulated scan information present in the composite video signal to be transmitted) is bandpass filtered to assure that the vestigial sideband of the video is within 4.2 MHz. That filtering removes the HRT information on the Y signal, but this same HRT information on the lower carrier frequency of 1.2 MHz can be transmitted along with the bandpass limited I and Q signals.

At the receiver, the color demodulator is not affected by the HRT information modulated at the same bandwidth ($\simeq$1.2 MHz) as the I signal but in phase with the Q signal. The I and Q signals, and the high resolution information modulated at 1.2 MHz, are separated by a bandpass filter and applied to a balanced demodulator using a 3.58 MHz reference frequency synchronized with the color carrier. At the input of the demodulator, the composite signal is bandpass limited so that the Q and I signals are applied to the demodulator separately for demodulating and then converting through a matrix of red, blue and green signals (R, G, B). The high resolution information at the output of the I bandpass amplifier is then synchronously detected using the same frequency and phase as used for modulating the high resolution information signal at 1.2 MHz at the transmitter. The high resolution information signal thus detected at the receiver is then modulated at the same frequency and phase as used in modulating the vertical scan at the television camera, and added to the Y signal for display with vertical modulation of the horizontal scan of the CRT display synchronized at the same frequency as at the source, using the color carrier as a reference to derive the modulation frequency, and controlling the phase and amplitude of modulation to be virtually the same as at the source. In that manner, the high resolution information of the composite video signal produced by the camera at the high vertical scan frequency, but transmitted at the lower frequency of 1.2 MHz in the Q channel, is displayed at the receiver.

The success of the high resolution television system just described depends upon control of the phase and amplitude of the CRT modulation. Consequently, an object of this invention is to provide a circuit for doubling the color subcarrier frequency at both the camera, or equivalent source, and the cathode ray tube (CRT) or equivalent display with independent phase and amplitude control.

SUMMARY OF THE INVENTION

In accordance with the present invention, the sinusoidal signal from a 3.58 color subcarrier oscillator at the information signal source and/or the display unit having an electron beam deflection coil is squared by a saturating amplifier and inverted by a second amplifier. Both the noninverted and inverted square waveforms are differentiated to obtain pulses at positive leading edges with precise timing of exponential decay such that the pulses cross a reference level in a period equal to one fourth the period of the sinusoidal signal. The reference level is set at an OR gate which receives both sets of pulses to produce a train of pulses which forms a squarewave of a frequency twice the frequency of the sinusoidal signal. This higher frequency squarewave signal is then used to gate current through an active switching element to a deflection means comprised of a coil and a capacitor connected in parallel to form a parallel-resonant circuit in series with the active switching element at precisely the frequency of twice the sinusoidal frequency of the local oscillator. An LC phase shift circuit at the input of the active saturating element is provided for phase adjustment of the squarewave signal that is doubled in frequency, and the capacitor in parallel with the coil is adjustable for fine tuning of the resonant frequency. The amplitude of the current through the coil is controlled by an adjustable and regulated power supply for the active switching element thus used to produce full sine wave signal through the coil.

DESCRIPTION OF PREFERRED EMBODIMENTS

Figure 1:
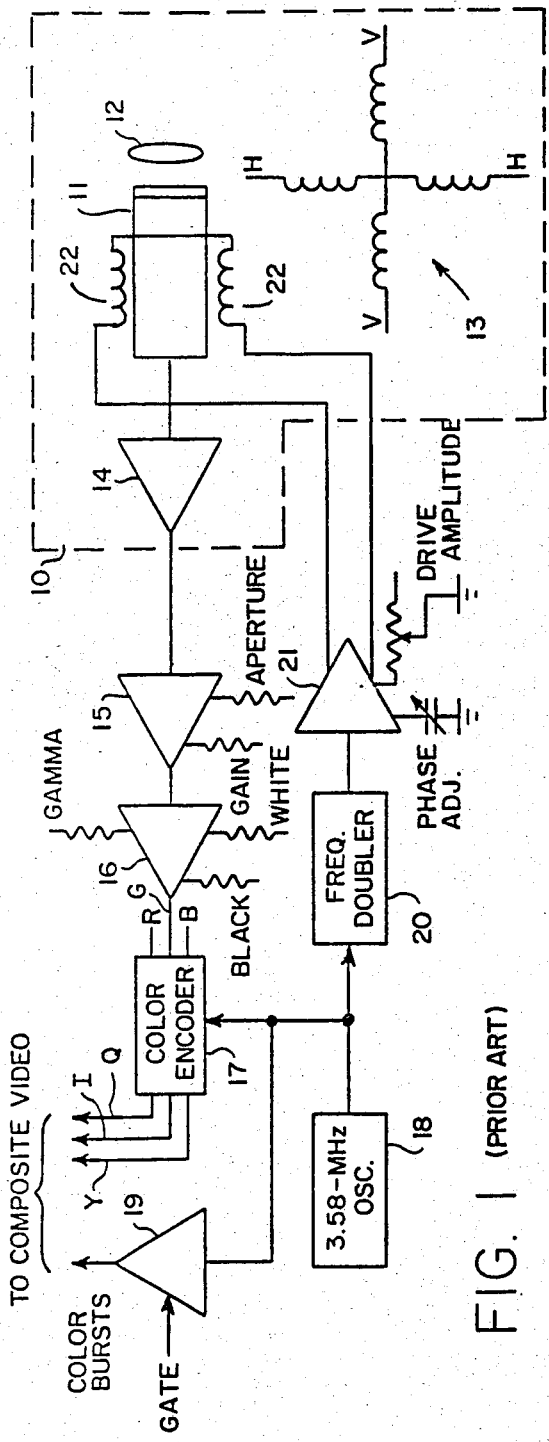
FIG. 1 illustrates schematically that part of a color television camera embodying the basic high resolution television system of the aforesaid patent application.

Referring to the drawings, FIG. 1 illustrates schematically those portions of a color television camera necessary for an understanding of the present invention which include a camera head 10 having a pickup tube 11, lens 12, and deflection yoke 13 for vertical and horizontal deflection of the electron scanning beam. The camera head is controlled by a unit (not shown) which provides the horizontal (H) and vertical (V) drive as well as blanking pulses in the usual manner. The video signal from the pickup tube 11 having a scanning yoke 13 is processed through a preamplifier 14, a video amplifier 15 (where the aperture and gain are set) and a processing amplifier 16 (where the black level, white level and Gamma are set).

The camera head 10 is shown with only one pickup tube 11, whereas for color television, three pickup tubes are used to scan the scene received through separate lenses and color filters that separate the red (R), blue (B), and green (G) light. Luminance is derived from the color primary signals R, G and B as a separate signal (Y) through a matrix assumed to be part of a color encoder 17. The one pickup tube shown is the green pickup tube. It may be unnecessary to modulate the vertical scan of the other pickup tubes since the high resolution information desired from the vertical scan modulation is present in the green tube which makes the greatest contribution to the luminance signal Y derived from the matrix according to the following equation:

$$Y = 0.30R + 0.59G + 0.11B$$

For optimum high resolution, all three pickup tubes should be modulated synchronously, provided their phase and amplitude can be adjusted and controlled to be the same at all times regardless of any variations in the power supply, but in practice it is not feasible to achieve registration of all three pickup tubes, so only the vertical deflection of the green pickup tube is modulated.

The color encoder matrix implements the following equations:

$$I = 0.68R - 0.28G - 0.32B$$

$$Q = 0.21R - 0.52G + 0.31B$$

The color encoder also modulates the I and Q signals with a color subcarrier at 3,579,545 Hz (hereinafter 3.58 MHz) from a stable oscillator 18 with a 90° phase difference between the I and the Q signals. The encoded color signals I and Q, and the luminance signals Y, are combined and applied to the television transmitter and/or monitor. Although the chrominance subcarrier per se is not transmitted, gated color subcarrier bursts are transmitted through a gated amplifier 19 during horizontal blanking periods for use in synchronizing the frequency and phase of a color reference oscillator at the receiver.

The essence of the basic high resolution television system described in the aforesaid Songer patent applications is to use the output of the color subcarrier oscillator 18, at the camera to modulate the vertical deflection of at least the green pickup tube during its 525 scan lines using a modulation frequency derived from the color oscillator 18 by a frequency doubler 20 through a driver 21 and electrostatic deflection plates in the pickup tube or, as shown, equivalent auxiliary deflection coils 22 located between the yoke 13 and pickup tube.

Figure 3:
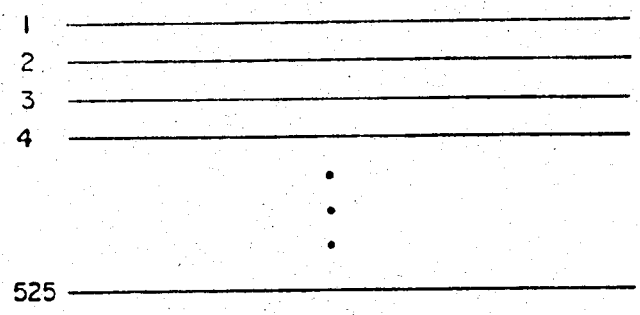
FIG. 3 illustrates schematically the straight parallel scan lines of conventional television scanning and display.
Figure 4:
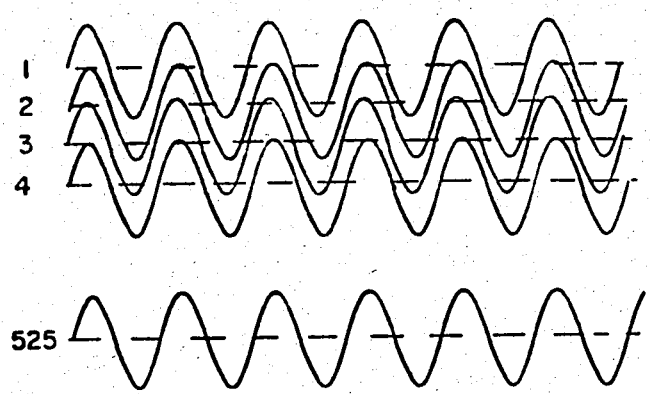
FIG. 4 illustrates schematically the undulating parallel scan lines of the aforesaid basic high resolution television system which increases vertical resolution.

The normal (unmodulated) scan follows a pattern shown in FIG. 3. In actuality, the lines are sloped downwardly from left to right as the vertical scan continues to move the beam from the top to the bottom for one field of 262.5 lines. The return (while the beam is blanked) is at a much greater rate than the scan, so that what is shown in FIG. 3 more nearly represents the return path for the blanked beam, but for the purpose of describing the basic HRT system, it may be assumed that the scan lines are exactly horizontal (as indeed they appear to the viewer). The modulation superimposed on adjacent lines from two fields of a frame is then shown in FIG. 4.

Because the modulated scan lines are not straight lines, each modulated line includes more information (pixels). In other words, 525 lines cover more area in the entire scene to increase the vertical resolution by about two or more times, depending upon the amplitude of modulation, the beam spot size and bandwidth of the video signal transmitted to the display unit. This greater amount of information is referred to herein as high resolution television (HRT) information. It consists of information at 7.2 MHz and its harmonics.

The literature speaks of the scan rate as 15,750 lines/sec for convenience, just as it does of the chrominance subcarrier as 3.58 MHz, but in actuality the number of lines scanned per second are 15,734.26374. Dividing that number of lines into 3,579,545 Hz yields 227.50000 cycles of modulation per scan line so the modulation pattern would repeat itself out of phase on every successive line of a field. It is desirable to have the same scanning pattern repeat itself in phase for every line of both fields of a frame. This could be achieved by inverting the modulating 3.58 MHz signal during every other line using the blanking signals to control logic for this phase inversion, but the mathematics of the NTSC standard is fortuitous in that, by doubling the modulating frequency in the frequency doubler 20, there will be 455.00000 cycles of modulation in every line scanned by the camera, and the higher frequency of modulation will increase the number of pixels included in each line scan, thereby increasing vertical resolution even more while also increasing horizontal resolution. Whether a scan line starts with a modulation of phase zero is not important; what is important is only that substantially the same modulation phase and amplitude be maintained from line to line. Notwithstanding that, a phase adjustment as well as an amplitude adjustment for half line spacing modulation can be made at the driver 21, if desired.

Figure 2:
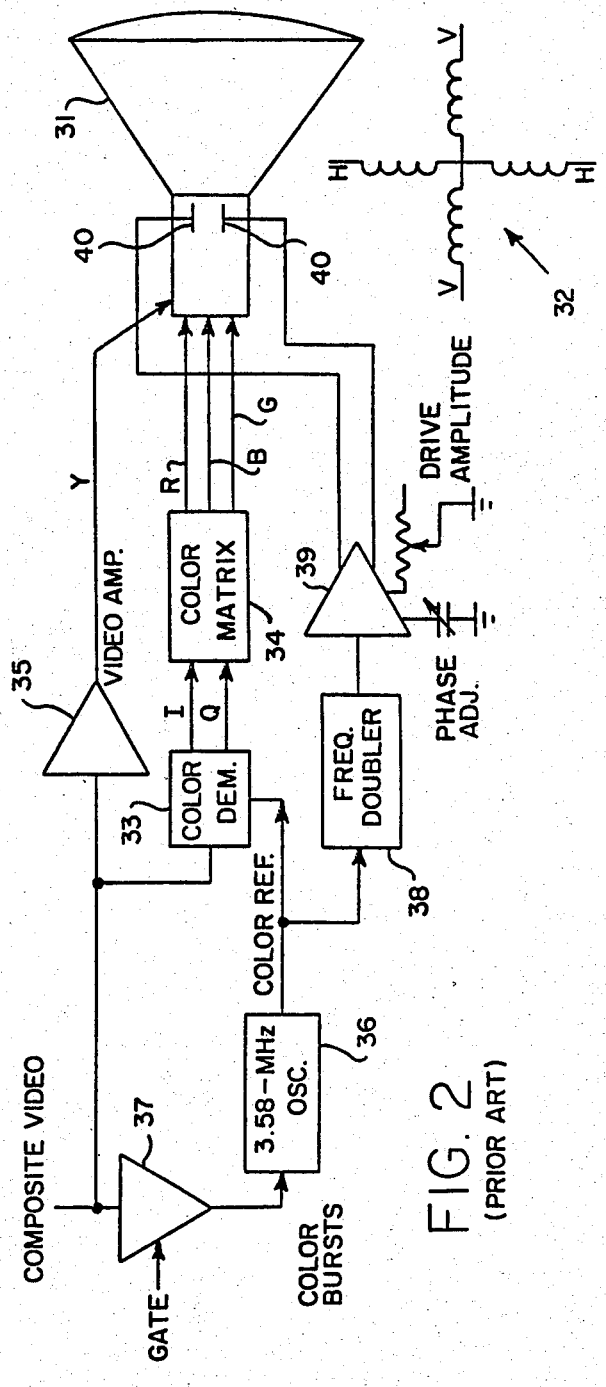
FIG. 2 illustrates schematically that part of a color television receiver embodying the basic high resolution television system of the aforesaid patent application.

FIG. 2 illustrates schematically those portions of a display unit (color television receiver or monitor) which are necessary for an understanding of the receiver end of the HRT system. Basically, the display unit is comprised of a picture tube (CRT) 31 and deflection yoke 32. The deflection yoke receives the normal horizontal (H) and vertical (V) drive signals to scan 525 lines in two interlaced fields of 262.5 lines. (The CRT also receives the normal line and frame blanking pulses during beam retrace periods, not shown.) The composite color video is passed through a color demodulator 33 and color matrix 34 for demodulating the encoded color signals I and Q and converting those signals into fundamental color signals (R, B and G). The luminance signal (Y) is passed by a video amplifier 35 to the picture tube for control of brightness.

For the color demodulation in the display unit, a color reference oscillator 36 tuned to precisely 3,579,545 Hz is synchronized by the gated color subcarrier bursts received via a gated amplifier 37 during each horizontal sync pulse, i.e., during each line blanking period. In that way, color demodulation (decoding) is synchronized with the color modulation (encoding) at the transmitter. The output of the synchronized 3.58 MHz oscillator 36 is also doubled by a frequency doubler 38 and then applied through a driver 39 to electrostatic deflection plates 40, or equivalent auxiliary deflection coils 40, in order to synchronously modulate the electron beam of the picture tube 31 as it is scanned 525 lines per frame by the yoke 32. The deflection plates, or equivalent auxiliary deflection coils, are aligned with the vertical deflection of the yoke 32. In that manner, the same line scan modulation pattern of the camera is synchronously repeated at the picture tube for the desired increase in vertical resolution. Synchronization is achieved through control of the phase of the color oscillator 36 at the display unit by the gated color burst. Since phase control of that oscillator is necessary for color demodulation, no penalty is incurred at the display unit. All that is necessary is a frequency doubler, electrostatic deflection plates or auxiliary deflection coils, and a driver between the plates or coils and the frequency doubler. Note that the camera also requires only a frequency doubler, driver and plates or coils. Everything else at the camera and display unit is the same as for a standard NTSC system.

Figure 5:
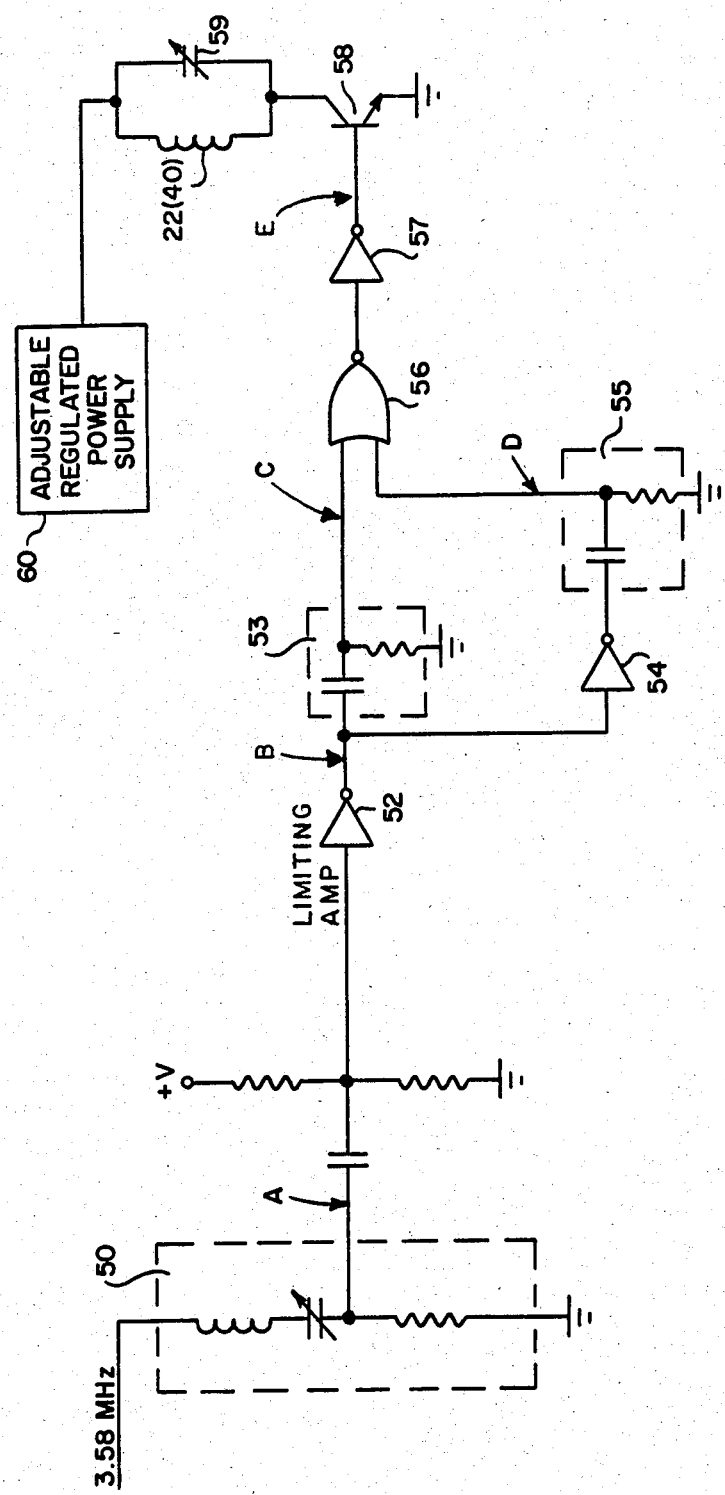
FIG. 5 illustrates schematically the implementation of the present invention at the television camera, or equivalent source, and the television receiver, or equivalent CRT display.
Figure 6:
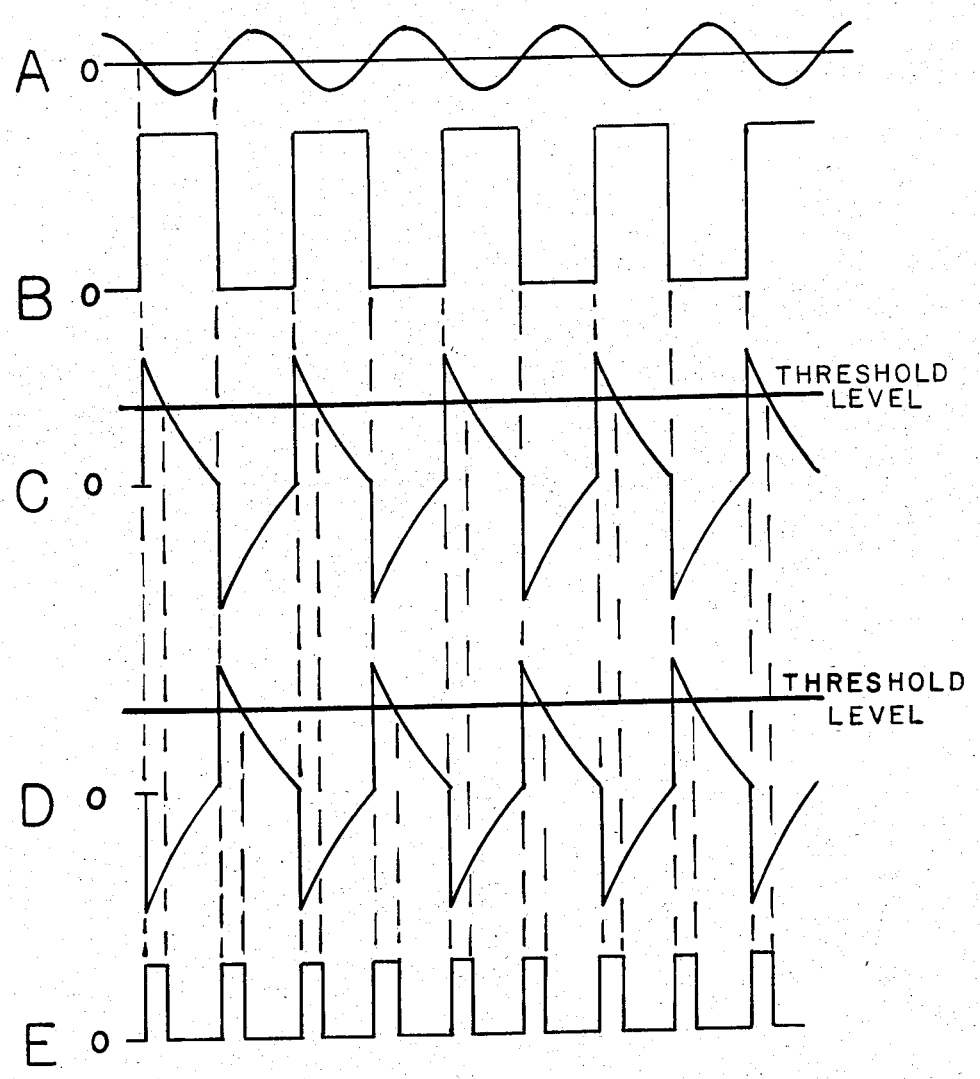
FIG. 6 illustrates waveforms useful in understanding the present invention.

A preferred embodiment of a circuit for doubling the frequency of the color subcarrier will now be described with reference to FIG. 5. It provides for control of both the amplitude and phase of vertical modulation of the horizontal scan. The 3.58 MHz signal from the local oscillator (synchronized by color bursts from the transmitter in the case of the receiver) is coupled by a series LC circuit 50 where the phase of the signal applied to the deflection coil 22 is adjusted between about ±80°, which results in an adjustment of about ±160° after frequency doubling. The sinusoidal output of the adjustable delay shown in waveform A of FIG. 6 is then squared, as shown in waveform B, using a high gain, saturating amplifier 52. An RC differentiatng circuit 53 that follows produces the waveform C in FIG. 6. An inverting amplifier 54 and RC differentiating circuit 55 produces the waveform D in FIG. 6, which is identical to the waveform C but displaced one half period of the 3.58 MHz cycle. The waveforms C and D are applied to a NOR gate 56 comprised of two OR connected amplifiers, preferably CMOS amplifiers, each of which is turned on when the applied signal exceeds a fixed threshold level shown in waveforms C and D. The outputs of these OR connected amplifiers are thus combined into one waveform, as shown, in waveform E, due to the threshold levels equal to or less than a quarter period of the subcarrier shown in waveform A, and in that manner, a squarewave is generated that is double the frequency of the 3.58 MHz color reference signal.

In that manner, output of the NOR gate 56 is coupled by a buffer amplifier 57 to the control terminal of an active switching element connected as an amplifier with an LC resonant load circuit, such as the base of a bipolar transistor 58, as shown, or the gate of a field effect transistor (FET). The active element gates current through the deflection coils 22 of the camera (or equivalent deflection coils of the receiver) during positive excursions of the signal at the output of the buffer amplifier 57 which is driven between saturation and cutoff. A capacitor 59 is connected in parallel with the deflection coils to form the LC resonant circuit. The capacitor may be variable for fine adjustment of resonant frequency but in practice that is not necessary. Amplitude adjustment of the vertical modulation of the horizontal scan is achieved by providing a regulated and adjustable power supply 60 for the switching transistor 58. It should be noted that the adjustment of ±160° at the series LC filter 50 can be augmented ±180° by simply reversing the connections to the deflection coil (or plates) for a total adjustment range of ±240°.

In the camera, where only the green color tube is modulated, and at the receiver, where there is only one electron beam to modulate, the phase and amplitude of modulation at 7.2 MHz may be adjusted for optimum high resolution television display, i.e., for precise match in phase and amplitude of the display tube with the camera pickup tube.

Figure 7A:
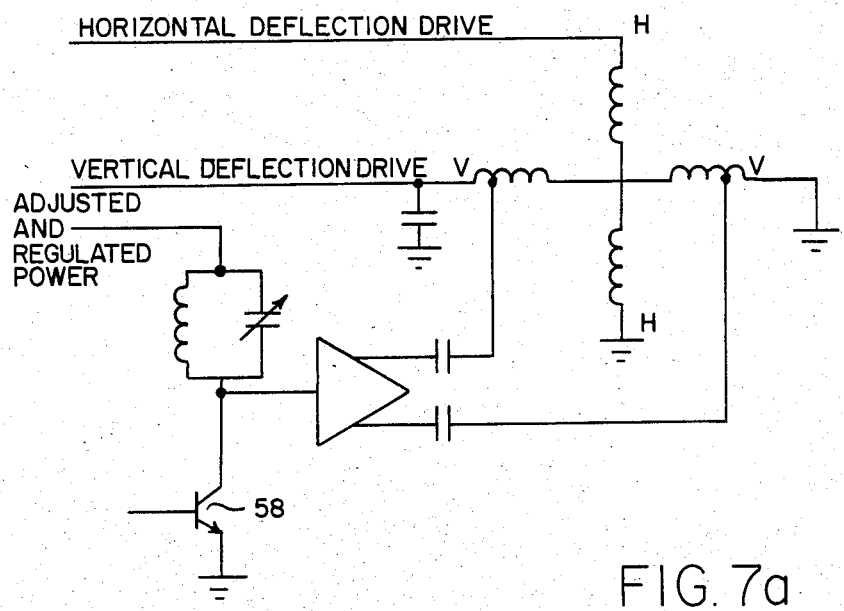
FIG. 7a illustrates an alternative arrangement for modulating the vertical deflection of a camera tube or a display cathode ray tube through the conventional deflection yoke.
Figure 7B:
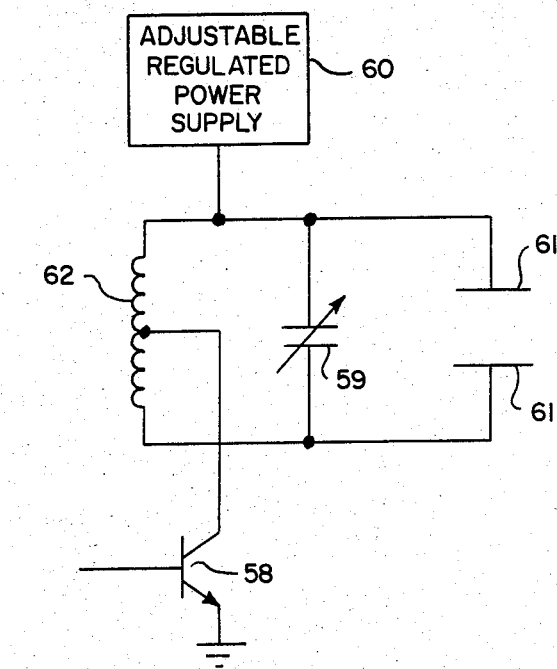
FIG. 7b illustrates an alternative arrangement for modulating the vertical deflection through auxiliary deflection plates.

Although a particular embodiment of the invention has been described and illustrated herein, with reference to the application of the invention to a television camera and receiver, it is recognized that the invention is suitable for other applications, such as data display terminals where digital storage and generation of video signals for character display on a CRT replaces the camera in a television system, and in tubes where deflection plates are used in place of coils, an inductor is connected across the plates, the capacitor is connected in parallel with the inductor to form the parallel LC resonant circuit. For any kind of signal source, or display unit utilizing vertical and horizontal display scan, the vertical deflection can be similarly modulated, using a separate inductor where there is not a deflection coil being used. Also, it should be recognized that in place of providing vertical deflection coils 22, or plates, it would be possible to add the 7.2 MHz vertical deflection modulation signal to the conventional vertical scan signal applied to the yoke of the camera pickup tube or receiver tube. This may be done by tapping the vertical deflection coil at the camera or receiver and capacitively coupling in to the taps the 7.2 MHz vertical deflection modulation signal as shown in FIG. 7a. In the case of utilizing the invention with deflection plates 61 at the camera or receiver, a tapped inductor 62 may be used for the LC resonant circuit connected between the deflection plates, as shown in FIG. 7b. Consequently, it is intended that the claims be interpreted to cover such equivalent video signal sources and equivalent display units.

What is claimed is:

1. In a system having means for producing video signals for display with vertical deflection of the horizontal scan modulated at twice the color subcarrier frequency for greater vertical resolution of information to be displayed on a display unit having vertical deflection coil of the horizontal scan to be modulated in synchronism with vertical modulation at the video signal source, a capacitor connected in parallel with an inductor to form an LC resonant circuit tuned to twice said color subcarrier frequency, a local oscillator at the display site for producing a sinusoidal signal synchronized in frequency and phase with said color subcarrier frequency, means for adjusting the phase of said sinusoidal signal and producing a square waveform signal from said sinusoidal signal, means for differentiating said square waveform with an RC circuit having a time constant selected to cause the decaying waveform cross a predetermined threshold level of a particular polarity in a period substantially equal to one quarter period of said color subcarrier frequency, means for inverting said square waveform, means for differentiating said inverted square waveform with an RC circuit having a time constant selected to cause the decaying waveform cross a predetermined threshold level of said particular polarity in a period substantially equal to one quarter period of said color subcarrier frequency, means responsive to the decaying waveforms of both differentiated square waveforms to produce a signal train of pulses, each pulse being produced from said decaying waveforms while they exceed said threshold, thereby generating a square waveform at a frequency that is twice said color subcarrier frequency, and an active switching element connected to conduct current through said deflection coil in response to each pulse in said train, said LC resonant circuit as a load.

2. The combination as defined in claim 1 including an adjustable and regulated power supply for current conducted by said active switching element, whereby the amplitude of vertical deflection modulation may be adjusted.

3. A combination as defined in claim 1 wherein said means for producing television video signal comprises a camera having a pickup tube with a vertical deflection coil to which a modulation signal is to be applied at twice the color subcarrier frequency in synchronism with said color subcarrier frequency, said vertical deflection coil for said pickup tube having a capacitor in parallel to form said LC resonant circuit tuned to twice said color subcarrier frequency, and said display unit includes a vertical deflection coil connected to said active switching element to conduct current through said deflection coil in response to each pulse in said train, said active switching element having its control input terminal connected as said inductor in said LC resonant circuit.

4. A combination as defined in claim 3 including a regulated power supply for current conducted by said active switching element connected to said deflection coil at said camera pickup tube and said display unit, whereby the amplitude of vertical deflection modulation may be adjusted.

5. In a system having means for producing video signals for display with vertical deflection of the horizontal scan modulated at a particular frequency for greater vertical resolution of information to be displayed on a display unit having vertical deflection coil of the horizontal scan to be modulated in synchronism with vertical modulation at the video signal source, a capacitor connected in parallel with an inductor to form an LC resonant circuit tuned to twice said particular frequency, a local oscillator at the display site for producing a sinusoidal signal synchronized in frequency and phase with said particular frequency, means for adjusting the phase of said sinusoidal signal and producing a square waveform signal from said sinusoidal signal, means for differentiating said square waveform with an RC circuit having a time constant selected to cause the decaying waveform cross a predetermined threshold level of a particular polarity in a period substantially equal to one quarter period of said particular frequency, means for inverting said square waveform, means for differentiating said inverted square waveform with an RC circuit having a time constant selected to cause the decaying waveform cross a predetermined threshold level of said particular polarity in a period substantially equal to one quarter period of said particular frequency, means responsive to the decaying waveforms of both differentiated square waveforms to produce a single train of pulses, each pulse being produced from said decaying waveforms while they exceed said threshold, thereby generating a square waveform at a frequency that is twice said particular frequency, and an active switching element connected to conduct current through said deflection coil in response to each pulse in said train, said LC resonant circuit as a load.

6. The combination as defined in claim 5 including an adjustable and regulated power supply for current conducted by said active switching element, whereby the amplitude of vertical deflection modulation may be adjusted.

* * * * *